United States Patent [19]

Whitney, Jr.

[11] Patent Number: 5,536,587
[45] Date of Patent: Jul. 16, 1996

[54] ALUMINUM ALLOY BEARING

[75] Inventor: Warren J. Whitney, Jr., Ypsilanti, Mich.

[73] Assignee: Federal-Mogul Corporation, Southfield, Mich.

[21] Appl. No.: 518,472

[22] Filed: Aug. 21, 1995

[51] Int. Cl.$^6$ .......................... B32B 15/20; C22C 21/00; F16C 33/12
[52] U.S. Cl. ........................ 428/653; 420/537; 384/912
[58] Field of Search ...................... 420/537; 384/912; 428/653

[56] References Cited

U.S. PATENT DOCUMENTS

| | | | |
|---|---|---|---|
| 2,790,216 | 4/1957 | Hunter | 22/57.5 |
| 2,850,776 | 9/1958 | Hunter | 22/57.5 |
| 3,078,563 | 2/1963 | Gould et al. | 29/494 |
| 3,386,161 | 6/1968 | Ruf | 29/487 |
| 3,562,884 | 2/1971 | Webbere | 29/149.5 |
| 3,809,551 | 5/1974 | Morisaki | 75/140 |
| 4,069,369 | 1/1978 | Fedor et al. | 428/557 |
| 4,278,740 | 7/1981 | Nara et al. | 428/653 |
| 4,296,183 | 10/1981 | Iwanhana et al. | 428/653 |
| 4,340,649 | 7/1982 | Nara et al. | 428/653 |
| 4,375,500 | 3/1983 | Nara et al. | 428/653 |
| 4,452,866 | 6/1984 | Kamiya et al. | 428/653 |
| 4,471,029 | 9/1984 | Fukuoka et al. | 428/653 |
| 4,471,030 | 9/1984 | Fukuoka et al. | 428/653 |
| 4,471,031 | 9/1984 | Fukuoka et al. | 428/653 |
| 4,471,032 | 9/1984 | Fukuoka et al. | 428/653 |
| 4,471,033 | 9/1984 | Fukuoka et al. | 428/653 |
| 4,617,172 | 10/1986 | Mori | 420/530 |
| 4,738,011 | 4/1988 | Mori | 29/149.55 |
| 4,789,607 | 12/1988 | Fujita et al. | 428/653 |
| 4,806,308 | 2/1989 | Kamiya et al. | 420/530 |
| 4,818,487 | 4/1989 | Kamiya et al. | 420/530 |
| 4,822,561 | 4/1989 | Kamiya et al. | 420/530 |
| 4,857,267 | 8/1989 | Maki et al. | 419/31 |
| 4,996,025 | 2/1991 | Pratt et al. | 420/554 |
| 5,053,286 | 10/1991 | Pratt et al. | 428/653 |
| 5,362,574 | 11/1994 | Tanaka et al. | 428/653 |
| 5,384,205 | 1/1995 | Tanaka et al. | 428/653 |

FOREIGN PATENT DOCUMENTS

| | | | |
|---|---|---|---|
| 57-16141 | 1/1982 | Japan | 428/653 |
| 2067220 | 7/1981 | United Kingdom | 428/653 |
| 2067219 | 7/1981 | United Kingdom | 428/653 |
| 2185041 | 7/1987 | United Kingdom . | |

Primary Examiner—John Zimmerman
Attorney, Agent, or Firm—Lawrence J. Shurupoff

[57] ABSTRACT

A shaft bearing is formed from an aluminum alloy that has approximately 8% Sn, 2.5% Si, 2% Pb, 0.8% Cu and 0.2% Cr on a weight-percentage basis. The tin has an average particle size less than 5 microns and the silicon has an average particle size less than 5 microns. The alloy may be formed into a continuous solid strip by a quench casting operation, wherein molten alloy is fed into an interface between two internally-cooled rolls to freeze the alloy into a solid strip condition in less than one second. The aluminum alloy strip can be pressure bonded to a steel backing strip to form a composite strip useful in forming a shaft bearing.

5 Claims, 2 Drawing Sheets

AL SN8 SI 2.5 PB2 CU0.8 CR0.2

10 MICRON

ALUMINUM ALLOY BEARING

BACKGROUND OF THE INVENTION

1. Field of the Invention

The present invention relates to a bearing that includes a steel backing and an aluminum alloy lining containing minor amounts of tin, silicon, lead, copper and chromium. The invention also relates to a method of manufacturing the alloy.

2. Description of Prior Developments

Bearings formed of aluminum alloys containing tin, silicon, lead and copper are known in the art. For example, U.S. Pat. No. 3,809,551 to Morisaki discloses an aluminum bearing alloy containing tin, lead, copper and antimony. U.S. Pat. No. 4,471,029 to Fukuoka et al. discloses a bearing alloy comprising aluminum and minor amounts of tin and silicon. The silicon particles have nodular or rounded configurations. Additional elements such as lead, indium, cadmium and bismuth can be incorporated in the alloy to improve the wear resistance of the alloy.

U.S. Pat. No. 4,471,033 to Fukuoka et al. discloses an aluminum base bearing alloy that comprises 5% to 11% silicon, 1.5% to 35% tin, minor amounts of an element selected from the group consisting of lead, indium, thallium, cadmium and bismuth, and minor amounts of an element selected from the group consisting of copper and magnesium. The particle size of the silicon particles is controlled by two annealing operations carried out before and after the bearing alloy strip is pressure bonded to a steel backing strip.

The first annealing operation in Fukuoka is at a temperature range between 350° C. and 550° C. for a time period ranging from 1.5 to 6 hours. The second post-bonding annealing operation is at a temperature range between 300° C. and 400° C. for a time period ranging from about 1 to 2 hours. This second post-bond anneal not only increases the cost of the alloy it also causes the tin particles to grow to a size far greater than that specified in the present invention, and also decreases the alloy hardness. Each of these factors decreases the fatigue strength of the prior art alloys to compensate for this drawback, the prior art requires the addition of greater amounts of copper to improve fatigue strength.

U.S. Pat. No. 4,789,607 to Fujita et al. relates to an aluminum base alloy containing tin, silicon, lead, strontium and antimony. U.S. Pat. No. 4,822,561 granted to Kamiya discloses a bearing alloy comprising aluminum and minor amounts of tin and copper, together with either manganese or zirconium. Optionally, the alloy can include lead and silicon.

SUMMARY OF THE INVENTION

The present invention concerns an aluminum alloy for shaft bearings wherein the alloy contains approximately 8% tin (Sn), 2.5% silicon (Si), 2% lead (Pb), 0.8% copper (Cu) and 0.2% chromium (Cr) on a weight percentage basis, balance aluminum. The improved aluminum alloy is specifically designed to take advantage of the quench casting and roll bonding processing technologies.

The improved aluminum alloy is designed to provide a desired grain structure when it is quench cast, and to have a high strength adherence to the steel backing strip after going through the roll bonding operation. Each alloying element is carefully balanced with each other alloying element to achieve a bearing alloy which optimizes seizure resistance, fatigue resistance, machinability and resistance to cracking during quench casting.

The new alloy is cast by a rapid solidification process, resulting in a fine distribution of components in the microstructure and contains a relatively low amount of soft phase (tin+lead), resulting in higher fatigue strength than would otherwise be expected. Despite the lower amount of soft phase, careful control of microstructure and careful selection of the other ingredients has resulted in superior seizure resistance. The aluminum alloy strip may be bonded directly to the steel back, obviating the need for an intermediary aluminum bonding layer of pure aluminum, nickel, silver or copper which have been thought to reduce the fatigue resistance of the lining and adds to the cost of the bimetal strip.

The tin and lead are present in the elemental state. They are soft phases that contribute to the embeddability of the alloy and give the alloy good anti-seizure properties. In an emergency situation, localized heating from high friction can cause the soft phase to melt, providing lubricity to the bearing surface and thereby deterring catastrophic failure.

The silicon has been found to greatly improve the wear resistance of the alloy. Silicon also makes a significant contribution to the anti-seizure properties of the alloy. It has been found that wear and seizure properties of this type of alloy are related.

The copper improves the fatigue strength and hardness of the alloy while decreasing its embeddability and its ability to conform to irregularities in crankshaft geometry or conformability. Therefore, the proper quantity of copper is critical.

The chromium has been found to augment the anti-seizure property of the alloy. Chromium is also thought to improve the high temperature strength of the alloy.

The hardness of the alloy is important. It has been found that a Vickers hardness of approximately HV 50 provides the optimum combination of seizure resistance and fatigue resistance.

For optimum results, it is believed that the particle size of the silicon and tin particles should be controlled within limits. The average particle size of the silicon should be about 4 microns with none of the particles being greater than about 15 microns. Silicon particles smaller than 4 microns adversely affect the seizure resistance and wear resistance. The tin should have as small a particle size as practical. A tin particle size of about 3 or 4 microns is attainable and effective according to the invention.

The aluminum alloy is designed to be processed into a bearing structure by quench casting the molten alloy into a solid strip and by roll bonding the alloy strip to a steel backing strip.

In a preferred practice of the invention, molten aluminum alloy is fed into an interface formed between two internally-cooled rotating metallic rolls such that the alloy is rapidly cooled from the molten state to a solid state in less than one second. The solid material emerges from the rolls as a continuous solid strip. The quench casting process freezes the alloy elements in the liquidus condition such that the copper and chromium are in solid solutions with aluminum, and the tin, lead and silicon are in dispersed particulate form within the aluminum matrix.

The aluminum alloy strip is pressure bonded to a steel backing strip by passing two mating strips of aluminum alloy and steel through a rotating roll assembly such that the aluminum strip is subjected to a relatively high pressure sufficient to bond the two strips together. The roll in contact with the aluminum alloy strip has a diameter significantly smaller than the diameter of the roll in contact with the steel strip so that, during the rolling operation, the thickness of the aluminum alloy strip is measurably reduced while the thickness of the steel strip remains essentially unchanged.

Prior to passage through the roll assembly, the mating strips are preheated to a temperature in the range of 550° F. to 650° F. In a modified process, only the steel strip is passed through a furnace and subsequently roll bonded to an aluminum strip which is heated by contact with the steel.

The alloy of the present invention provides a bearing surface having a desired combination of wear resistance, shaft-seizure resistance, fatigue resistance, lubricity, embeddability and conformability. No electroplating of the bearing surface with lead-based alloys is required. In many prior art bearings, the bearing surface must be overplated with a lead-based alloy, e.g., lead and tin, lead and copper or lead and indium. Such overplating is commonly used to protect against shaft seizure particularly when the shaft is formed of nodular cast iron. Bearings formed under the present invention provide reasonably good shaft seizure resistance without overplating the bearing surface.

Under conventional thinking, a large tin percentage is required to achieve satisfactory shaft-seizure resistance. Under one shaft-seizure scenario, the tin melts to form a thin lubricating film in response to high shaft seizure loads. Conventional thinking is that a high Sn percentage is required to achieve the desired lubricating film. The alloy of the present invention uses a relatively low tin concentration while still achieving a relatively good anti-seizure resistance. It is believed that the presence of the chromium and the reduced or small quantity of copper as compared to other similar bearing alloys enhance the anti-seizure action of the tin in the alloy.

The specific nature of the invention will be apparent from the following more detailed description and associated drawings.

The aforementioned objects, features and advantages of the invention will, in part, be pointed out with particularity and will, in part, become obvious from the following more detailed description of the invention, taken in conjunction with the accompanying drawings, which form an integral part thereof.

BRIEF DESCRIPTION OF THE DRAWINGS

In the Drawings.

In the various figures of the drawings, like reference characters designate like parts.

DETAILED DESCRIPTION OF THE PREFERRED EMBODIMENTS

The present invention relates to an alloy formed primarily of aluminum and to a bearing formed at least partially from the alloy. A principal use of the bearing is in internal combustion engines for supporting an engine crankshaft. Aluminum is advantageous in such an environment because of its corrosion resistance, load-carrying ability, fatigue resistance and thermal conductivity. Certain alloying elements are added to the aluminum to enhance particular capabilities of the pure metal.

A preferred as-cast aluminum alloy contains approximately 8% Sn, 2.5% Si, 2% Pb, 0.8% Cu and 0.2% Cr on a weight percentage basis. The tin preferably has an average particle size of about 4 microns in the as-cast alloy strip. Similarly, silicon has an average particle size less than 5 microns in the as-cast alloy strip. The Si and Sn particles are distributed in a very fine inter-granular network.

The alloy is prepared by heating the aluminum and alloying elements to a temperature slightly above the melting point of the pure aluminum which is 1215° F. The melting points for the various alloying elements are, respectively, 449° F. for Sn, 2600° F. for Si, 621° F. for Pb, 1981° F. for Cu and 2840° F. for Cr.

Copper and chromium are frozen in solid solution with the aluminum rather than forming intermetallic compounds.

Figure 1:
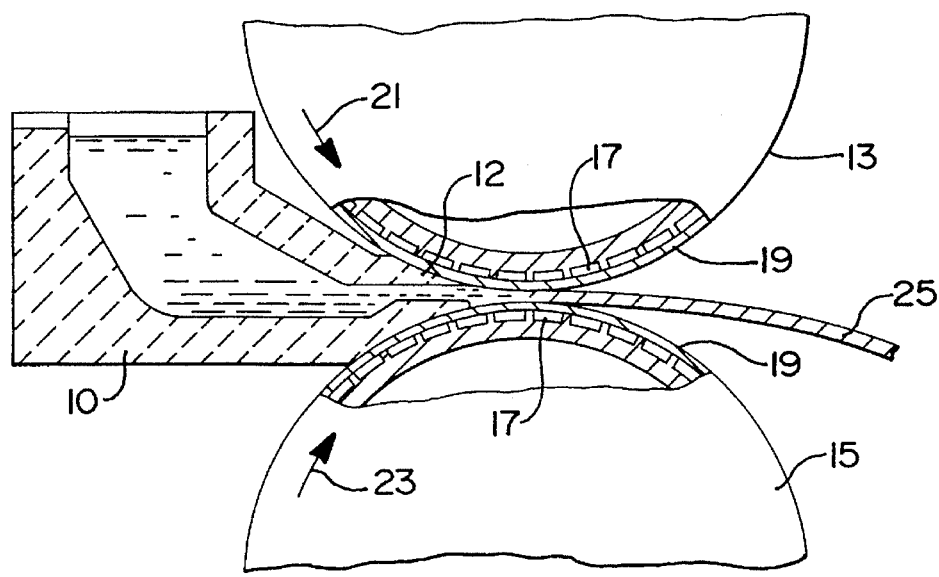
FIG. 1 is a fragmentary view in partial section of a quench casting apparatus that can be used in practice of the invention.

U.S. Pat. No. 5,053,286 to Pratt et al. discloses an apparatus than can be used to achieve the desired quench cast process. FIG. 1 is a general representation of the apparatus more particularly described in U.S. Pat. No. 5,053,286. As shown in FIG. 1, molten aluminum alloy containing Sn, Si, Pb, Cu and Cr is supplied to a crucible 10 that has a slit-like discharge nozzle 12 located between two rotating rolls 13 and 15. The thickness dimension of the nozzle slit may be about 4 millimeters. Each rotating roll has an array of internal coolant channels or passages 17 located in close proximity to a relatively thin metal skin 19.

Each skin 19 is preferably formed of copper or other metal having a high thermal conductivity whereby the skin material is enabled to rapidly transmit heat from the molten aluminum alloy to the coolant passing through channels 17. The aluminum alloy is thereby rapidly cooled from the molten state to the solid state in a relatively short time period, i.e. less than one second. Cold water can be used as the coolant.

The internally cooled rolls 13 and 15 are continuously driven in the directions indicated by numerals 21 and 23 such that freshly-cooled roll surfaces are being continuously presented to the molten material as it is discharged through the slit-like discharge nozzle 12. The molten aluminum alloy is continuously replenished in crucible 10 to maintain an essentially constant hydrostatic head on the molten material being discharged through the nozzle slit 12. The alloy is rapidly cooled to a solid state in less than one second, preferably only about one-half second. The cooled and solidified alloy emerges from the rolls as a continuous solid strip 25 having a thickness dimension corresponding to the spacing between the opposed roll surfaces. Strip 25 can be wound on a spool (not shown) for temporary storage in coil form.

The quench cast operation freezes and preserves the lead particles formed while the alloy is in the molten state. Also, the quench cast operation minimizes gravitational migration of the relatively heavy lead particles from the upper zone of strip 25 into the lower zone of the strip. The quench cast strip 25 has a reasonably uniform and fine dispersion of the Sn particles and Sn-Pb particles. The high quench rate also produces an alloy casting with a very fine and uniformly dispersed distribution of silicon particles.

Prior to bonding to a steel backing strip, the as-cast alloy is heat treated and rolled to a thickness suitable for bonding, i.e. 1 mm to 3 mm. Heat treatment may be carried out above 350° C. for at least one hour to reduce the hardness of the alloy so as to promote its ability to bond to the steel backing.

Figure 2:
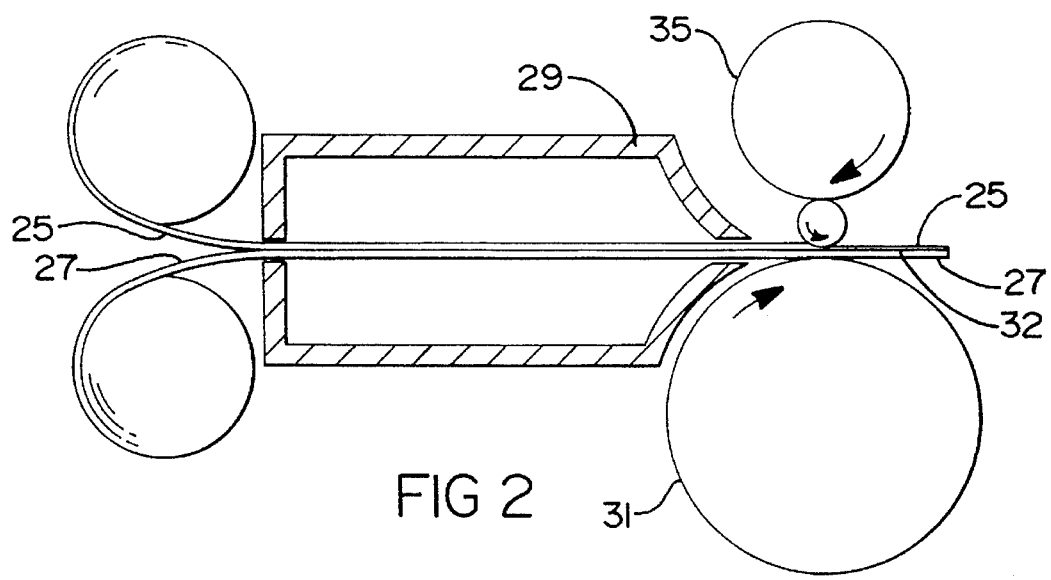
FIG. 2 is a diagrammatic view of an apparatus that can be used to pressure bond an aluminum alloy strip to a mating steel strip in the practice of the invention.

The rolled and heat treated strip 25 is pressure bonded to a steel strip by the apparatus shown schematically in FIG. 2. As shown in attached FIG. 2, the quench cast aluminum alloy strip 25 is mated to a steel strip 27 and then passed through a furnace 29. The mating strips are heated by the furnace to a temperature in the range of 600° F. to 700° F. The furnace atmosphere is a reducing, non-oxidizing atmosphere to protect the steel strip from undesired surface oxidation while it is in the heated condition. It is possible to heat only the steel strip and to join the heated steel strip with an aluminum strip which is heated by contact with the hot steel strip prior to roll bonding to the steel strip.

The heated strips 25 and 27 are passed through a steel roll assembly that includes a relatively large diameter lower roll 31 and a relatively small diameter roll 33. The small diameter roll is reinforced or backed-up by a larger idler roll 35 such that roll 33 is enabled to exert a substantial unit area force on the aluminum alloy strip 25 without bending or deforming. The spacing between rolls 31 and 33 is less than the combined initial thickness of strips 25 and 27 such that the aluminum alloy strip is compressed and appreciably reduced in thickness during passage of the mating strips 25 and 27 through the rolls. Lower roll 31 is powered to provide the force for moving the mated strips through the space between rolls 31 and 33.

The diameter of roll 31 is preferably at least two times the diameter of roll 33 so that roll 33 exerts a substantially greater unit area force on the aluminum alloy roll than the unit area force exerted by roll 31 on the steel strip 27. The aluminum alloy strip is substantially reduced in thickness while the thickness of the steel strip remains essentially unchanged during passage of the mated strips through the space formed between rolls 31 and 33.

The hardness of the steel strip is not significantly increased by the rolling operation so that the emerging composite strip 32 (FIG. 2) is workable and reshapable into desired bearing configurations. Other alloys of this type are bonded at significantly lower temperatures by a process which significantly reduces the steel thickness, increasing its hardness and reducing its ductility. It is not believed possible to use the described hot binding process with prior art alloys because the heat causes the tin in these conventional alloys to form masses of large randomly oriented growths of tin. These growths then form elongated ribbon-like structures called stringers during subsequent rolling operations. It may not be possible to make flange bearings with the prior process. However, it is possible with this process.

Figure 3:
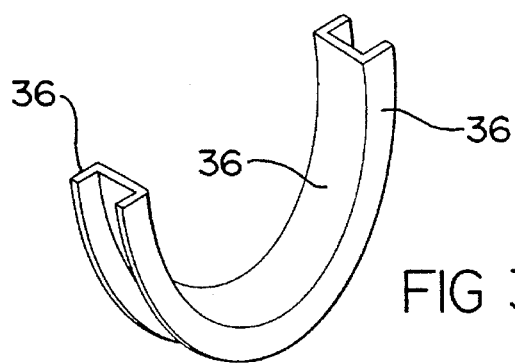
FIG. 3 is a perspective view of a crankshaft half bearing that can be formed from the composite alloy-steel strip produced by the FIG. 2 apparatus.

FIG. 3 shows a representative half bearing configuration used in an engine for rotatably supporting the engine crankshaft. In FIG. 3, the aluminum alloy surfaces are designated by numeral 36. A similar half bearing is mated to the FIG. 3 structure to form a complete bearing assembly encircling the shaft.

The pressure bonding operation may be carried out without plating a protective layer or film on the steel surface in contact with the aluminum alloy surface. Under prior practice, a protective film of pure aluminum, nickel, silver or copper on the steel surface is necessary to achieve a good bond between the steel and the aluminum alloy. Because of the relatively low tin content in the present invention and because of the fine tin microstructure, as compared to other bearing alloys, no intermediate bonding layer is required and no post bonding heat treatment is required in the present invention.

Tin is included in the aluminum alloy in a concentration of 8% on a weight basis. The average particle size of the Sn is preferably less than 10 microns and more preferably less than 5 microns. A low Sn particle size is desirable in that the alloy is thereby strengthened against fatigue. Although the amount of tin present in the aluminum alloy according to the invention is significantly less than that used in other commercially available aluminum bearing alloys, it has been found by testing that superior fatigue strength is achievable even if the amount of copper present is also reduced from conventional levels. This is an unexpected result.

The Sn improves the shaft seizure resistance by providing lubricity and conformability. When the shaft is formed of nodular cast iron, the shaft surface may be relatively rough. The tin particles can reduce seizure of the rough shaft surface without tearing from the bearing surface.

The silicon, in finely divided form, contributes to the wear resistance of the bearing. The optimally-sized hard silicon particles exert a polishing action on rough shaft surfaces thereby removing minor roughness that could produce premature bearing wear.

In the present invention, a silicon particle size of about 4 or 5 microns is desired. If the average size of Si particles is smaller than about 4 or 5 microns, the seizure resistance and wear resistance are reduced since it is believed that the Si particles tend to break away from the bearing surface.

Lead is included as an alloying element because of its ability to absorb foreign particles, e.g., particles generated by the polishing action of the silicon or particles entrained in the lubricant film.

Copper is included in the alloy because it acts as an alloy hardener and because it contributes high temperature strength to the alloy. Because the amount of copper is less than that used in conventional bearing alloys, the ability of the present alloy to absorb foreign particles is enhanced.

Chromium is used to enhance the anti-seizure properties of the alloy and to improve the high temperature strength of the alloy. The alloy has a Vickers hardness of approximately HV 50.

The tin nominally has a weight concentration of 8%. However, the tin percentage can vary from about 6% to 10% while still achieving desired properties. When the tin content is above 10%, it is difficult to cast the alloy by the disclosed high quench rate casting process. Tin, in the specified range, together with lead, contributes to improved lubricity, conformability and shaft seizure resistance. It is desirable to maintain the tin content at a relatively high level of about 8% to 10% by weight, since the more tin present the better the seizure resistance provided the tin particle size is kept small, i.e. less than 10 microns on average and preferably less than 5 microns on average. Although the invention will perform well at lower tin contents of 6% and 7%, better results are achieved at tin contents in excess of 7% and up to 10%.

The lead nominally has a weight percentage of 2%. However, the lead concentration can be in the range from 1.5% to 2.5%. The upper limit on the lead concentration is dictated at least partly by the fact that, with higher concentrations, the lead does not dissolve in the aluminum at normal casting temperatures. The lower limit of 1.5% is needed for adequate shaft seizure resistance, lubricity and embeddability.

The copper concentration can be in the range of 0.7 to 0.9%. Above a 0.9% copper concentration, the alloy tends to be brittle and subject to shaft seizure, especially when the shaft is formed of nodular cast iron. The lower limit of 0.7% copper concentration, in combination with the chromium, is needed to provide adequate fatigue strength and hardness.

Silicon has a nominal concentration of 2.5%. However, the silicon concentration can be slightly less or slightly more than 2.5% in this particular aluminum alloy. The more recent work with this alloy indicates a satisfactory silicon range to be 2.25% to 2.75%. If the silicon concentration is higher than this range, the bearing tends to be too hard for most intended applications. The alloy also becomes brittle and difficult to machine, while the resistance to shaft seizure is reduced. When the silicon concentration in the particular alloy is appreciably below 2.5%, the silicon does not adequately perform its function as a deterrent to seizure. Also, the wearability of the bearing surface suffers.

Aluminum alloys having the specific alloying elements and percentages herein disclosed are believed to be advantageous over the prior art in that the alloy can be directly bonded to the steel backing sheet without an interlayer of nickel or copper, as was often necessary under prior art practices. The improved bond between the aluminum and steel is achieved partly by the presence of the silicon in the 2.5% weight concentration and small average particle size. The lower tin concentration compared to other Al-Sn-Si alloys and small tin particle size is also a factor in that it permits the roll bonding operation to be carried out at a relatively high metal strip temperature in the range of 550° F. to 650° F. The higher temperatures, in conjunction with the roll pressure, result in good bonding between the aluminum alloy and the steel backing strip without the need for a bonding interlayer.

Figure 4:
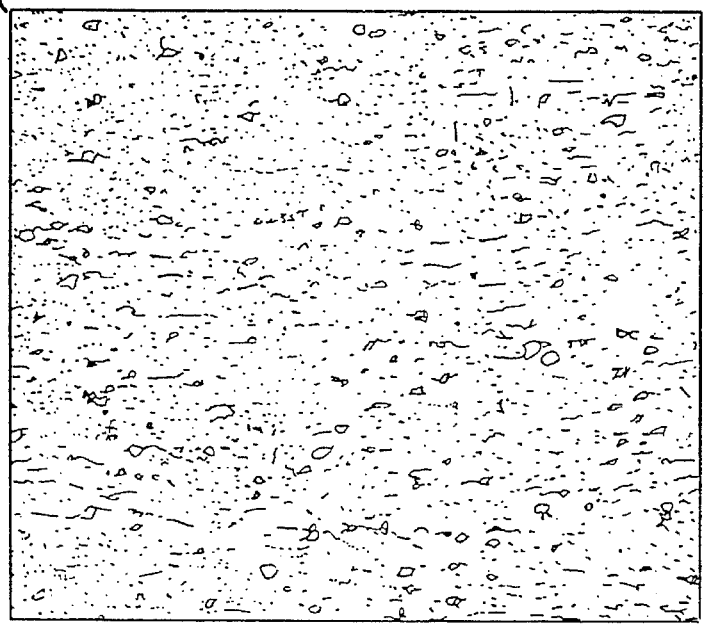
FIG. 4 is a representation of a photomicrograph of an aluminum alloy formed according to the present invention.

The microstructure of the alloy shown, for example, in FIG. 4 includes relatively small islands of tin and lead in the aluminum matrix, together with relatively large silicon particles and smaller intermetallic particles of copper-aluminum and chromium-aluminum. The intermetallic compounds are thought to improve the high temperature strength of the alloy without adversely affecting the seizure resistance.

The alloy of the present invention, when processed into bearings by the quench casting and roll bonding procedures, has been found to have overall performance improvements in the areas of seizure resistance, fatigue resistance and corrosion resistance when compared to prior art bearing alloys, e.g., the alloys described in U.S. Pat. Nos. 5,053,286 and 4,471,029. Moreover, the alloy of the present invention also is easier to manufacture than such prior alloys and less costly to make.

Figure 5:
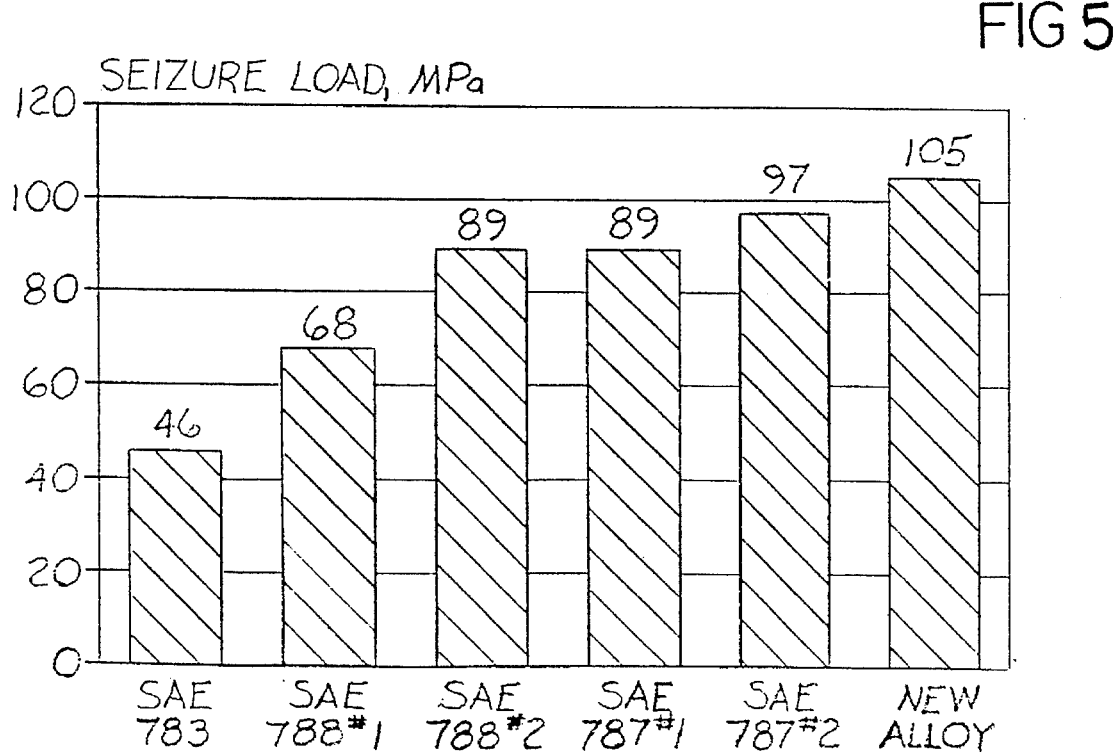
FIG. 5 is a graph of bearing seizure test results for various prior art bearing alloys and for an alloy formulated according to the present invention.

Results of seizure testing of conventional alloys are shown in FIG. 5. Each bar represents an average of ten tests. The present invention (new alloy) exhibits the best seizure testing of this group. The composition of the new alloy tested was Al Sn8 Si2.5 Pb2 Cu0.8 Cr0.2.

Obviously, numerous modifications and variations of the present invention are possible in the light of the above teachings. It is therefore to be understood that within the scope of the appended claims, the invention may be practiced otherwise than as specifically described herein.

What is claimed is:

1. A bearing, comprising:

an aluminum alloy lining bonded to a steel backing;

said alloy, on a weight percentage basis, consisting essentially of approximately 8% Sn, 2.5% Si, 2% Pb, 0.8% Cu, 0.2% Cr and the balance aluminum; the Sn having an average particle size less than 10 microns and the Si having an average particle size less than 5 microns and wherein the tin and lead are in the form of small islands in an aluminum matrix and the copper and chromium are in the form of copper-aluminum particles and chromium-aluminum particles.

2. The bearing of claim 1, wherein the aluminum alloy lining is directly bonded to the steel backing without any intervening material therebetween.

3. The bearing of claim 1, wherein the aluminum alloy lining is a strip formed by a quench casting process.

4. A bearing, comprising:

an aluminum alloy lining bonded to a steel backing;

said alloy comprising essentially on a weight-percentage basis approximately 6 to 10% Sn, 2.25 to 2.75% Si, 1.5% to 2.5% Pb, 0.7% to 0.9% Cu, 0.15 to 0.25% Cr. and the balance aluminum, and wherein the Sn has an average particle size less than 10 microns and wherein the Sn and Pb are in the form of small islands in an aluminum matrix, and at least some of the copper and chromium are in the form of copper-aluminum particles and chromium-aluminum particles.

5. A bearing alloy, comprising on a weight-percentage basis approximately 6 to 10% Sn, 2.25 to 2.75% Si, 1.5% to 2.5% Pb, 0.7% to 0.9% Cu, 0.15 to 0.25% Cr. and the balance aluminum, and wherein the Sn has an average particle size less than 10 microns and wherein the Sn and Pb are in the form of small islands in an aluminum matrix, and at least some of the copper and chromium are in the form of copper-aluminum particles and chromium-aluminum particles.

\* \* \* \* \*